United States Patent
Luedi et al.

(10) Patent No.: US 12,434,328 B2
(45) Date of Patent: Oct. 7, 2025

(54) CALIBRATION OF A QUALITY ESTIMATOR FOR A LASER CUTTING METHOD

(71) Applicant: BYSTRONIC LASER AG, Niederönz (CH)

(72) Inventors: Andreas Luedi, Burgdorf (CH); Roland Bader, Ruetschelen (CH); Stefan Alfons Jacobi, Bad Westernkotten (DE)

(73) Assignee: BYSTRONIC LASER AG, Niederönz (CH)

(*) Notice: Subject to any disclaimer, the term of this patent is extended or adjusted under 35 U.S.C. 154(b) by 0 days.

(21) Appl. No.: 18/577,615

(22) PCT Filed: May 30, 2022

(86) PCT No.: PCT/EP2022/064584
§ 371 (c)(1),
(2) Date: Jan. 8, 2024

(87) PCT Pub. No.: WO2023/285018
PCT Pub. Date: Jan. 19, 2023

(65) Prior Publication Data
US 2024/0261890 A1   Aug. 8, 2024

(30) Foreign Application Priority Data
Jul. 12, 2021   (EP) .................................. 21184974

(51) Int. Cl.
*B23K 26/03*   (2006.01)
*B23K 31/00*   (2006.01)
*G01D 18/00*   (2006.01)

(52) U.S. Cl.
CPC .......... *B23K 26/032* (2013.01); *B23K 31/006* (2013.01); *G01D 18/00* (2013.01)

(58) Field of Classification Search
CPC ....... B23K 31/006; B23K 26/38; G01D 18/00
See application file for complete search history.

(56) References Cited

U.S. PATENT DOCUMENTS 4,866,641 A  *  9/1989  Nielsen ................... E02F 9/264
                                                          340/685
9,529,343 B2    12/2016  Bauer et al.
(Continued)

FOREIGN PATENT DOCUMENTS

DE    102019209088 A1   12/2020
EP         2357057 A1    8/2011
(Continued)

OTHER PUBLICATIONS

Santolini et.al., Cut Quality Estimation in Industrial Laser Cutting Machines: A Machine Learning Approach, Apr. 9, 2020, IEEE, downloaded from DOI: 10.1109/CVPRW.2019.00052. (Year: 2020).*
(Continued)

*Primary Examiner* — Michael J Dalbo
*Assistant Examiner* — Denise R Karavias
(74) *Attorney, Agent, or Firm* — Workman Nydegger

(57) ABSTRACT

The invention relates to a calibration module for calibrating a real-time estimator, which is intended for quality estimation of a cutting method using a laser cutting machine, comprising: a load interface for loading a quality estimation result of the real-time estimator; a first processor, which is intended to provide a quality measurement result of the cutting edge of the workpiece, wherein the quality measurement result can be provided in particular by detecting measurement signals of a cutting edge of a finished cut workpiece by means of a measuring device; and wherein a second processor is intended to compare the loaded quality estimation result with the quality measurement result and based on the result: is intended to calculate a calibration data set for calibrating the real-time estimator an output interface (A) which is intended to output the calculated calibration data set.

20 Claims, 10 Drawing Sheets

(56) References Cited

U.S. PATENT DOCUMENTS

| | | | |
|---|---|---|---|
| 10,675,709 B2 | 6/2020 | Luedi et al. | |
| 2003/0234240 A1* | 12/2003 | Yamazaki | B23K 26/702 |
| | | | 219/121.62 |
| 2011/0192825 A1* | 8/2011 | Calefati | B23K 31/12 |
| | | | 219/121.64 |
| 2013/0178952 A1* | 7/2013 | Wersborg | G06F 18/21355 |
| | | | 700/47 |
| 2017/0270434 A1* | 9/2017 | Takigawa | B23K 26/38 |
| 2020/0254559 A1* | 8/2020 | Lüdi | B23K 26/38 |

FOREIGN PATENT DOCUMENTS

| | | | |
|---|---|---|---|
| EP | 3159093 B1 | 7/2018 | |
| EP | 3671373 A1 * | 6/2020 | B23K 26/00 |
| EP | 3885069 A1 | 9/2021 | |
| WO | 2020069889 A1 | 4/2020 | |
| WO | 2020127004 A1 | 6/2020 | |
| WO | 2021073946 A1 | 4/2021 | |

OTHER PUBLICATIONS

Tatzel et al., Image-based roughness estimation of laser cut edges with a convolutional neural network, 11th CIRP Conference, Sep. 7-10, 2020, provided by Applicant, IDS, Non Patent Literature, #3 (Year: 2020).*

International Search Report and Written Opinion, mailed Sep. 6, 2022, from PCT/EP2022/064584, 9 pages.

Santolini, G. et al., "Cut Quality Estimation in Industrial Laser Cutting Machines: A Machine Learning Approach", Conference on Computer Vision Recognition Workshops (CVPRW), Jun. 16-17, 2019.

Tatzel L. et al., "Image-based roughness estimation of laser cutting edges with a convolutional neural network", 11th CIRP Conference on Photonic Technologies (Lane 2020), Sep. 7-10, 2020.

Giusti A. et al., "Image-based Measurement of Material Roughness using Machine Learning Techniques", 20th CIRP Conference on Electro Physical and Chemical Machining, Procedia CIRP 95 (2020), pp. 377-382.

De Mitri O. et al., "Image acquisition, evaluation and segmentation of thermal cutting edges using a mobile device", Proceedings of SPIE, vol. 11059, Multimodal Sensing: Technologies and Applications, Jun. 21, 2019.

Soukup D, et al., "Convolutional Neural Networks for Steel Surface Defect Detection from Photometric Stereo Images", International Symposium on Visual Computing, Dec. 8, 2014, pp. 668-677. In: Bebis G. et al. (eds) Advances in Visual Computing. ISVC 2014. Lecture Notes in Computer Science, vol. 8887. Springer, Cham, https://doi.org/10.1007/978-3-319-14249-4_64.

International Preliminary Report on Patentability, mailed Nov. 6, 2023, from EPO International Preliminary Examining Authority, 55 pages.

* cited by examiner

CALIBRATION OF A QUALITY ESTIMATOR FOR A LASER CUTTING METHOD

The invention relates to the field of industrial laser processing, in particular the cutting of workpieces made of metal or other materials, which are supplied, for example, as metal plates on a work table of the laser cutting machine. The invention relates to the calibration of a quality estimator for estimating the cutting quality of a laser cutting method.

Important aspects of a laser cutting machine are its cutting quality, cutting speed and machine autonomy. If the cutting process can be monitored effectively, the machine can be improved in all three essential criteria. Accordingly, monitoring the cutting process has become increasingly important in recent years. Today's machines are increasingly equipped with photodiodes and sometimes even cameras, which enable real-time monitoring of the machining process.

By monitoring the cutting process, it is now possible to detect or even prevent a tear, i.e. a failure to cut through the material. For this purpose, photodiodes are usually attached to the cutting head, which monitor the process. However, what still remains a challenge is reliable cutting quality detection. In the case of methods known from the prior art, it cannot be identified, for example, whether the cut part is cut too rough, with a burr and/or slag adhesion.

The subsequent measurement of cutting edges of cut parts has also become established, wherein the focus is now mostly on the cutting quality. Imaging devices such as cameras are often used for this purpose. With suitable methods and algorithms, the cutting quality can be extracted from the captured images of the cutting edge based on a number of quality parameters such as roughness, presence of burrs or slag adhesion and other quality criteria. This information can also be used to optimally set the cutting parameters for future cutting operations.

DE102019209088A1 also proposes using mobile phone photos to assess cutting edges.

U.S. Pat. No. 9,529,343B2 also addresses the presently established prior art. It is proposed therein to collect both sensor data that is generated during cutting and image data of the cutting edge that is recorded after cutting, to combine these and thus jointly derive a determination of the cutting performance and, if necessary, to provide suggestions for improving said cutting performance.

It is also known from WO2020127004A1, to optimise the cutting process itself using a deterministic cutting model in a calibration process. Images from cameras of the cutting edge can be used to adjust/adapt the cutting model. Furthermore, the cutting edge quality determined on the basis of the model can be compared with the quality of the cutting edge determined using the camera.

WO2020069889A1 also proposes something similar. A method parameter algorithm is presented, which provides optimised method parameters for the cutting process based on the material and machine parameters as well as the desired cutting edge quality. In addition, the edge quality achieved can be recorded with a camera and also made available to the algorithm in order to further optimise the method parameters.

WO2021073946A1 shows that, for example, monitoring conditions can first be defined in a configuration phase, so that, so to speak, first a processing step for setting a monitoring condition takes place, then a processing step with monitoring activated and, via a process signal, again entering a setting step for determining a new monitoring condition.

Finally, EP3159093B1 should be mentioned, which describes a camera arrangement on the cutting head in order to be able to observe the process coaxially along the processing laser in real time during cutting in order to be able to interrupt the cutting process with an error message or continue it in a modified way (with changed cutting parameters) or to initiate a post-processing of defects.

The above documents disclose ways to improve quality by adjusting the cutting parameters. In this case, estimation methods can be used in order to estimate the quality of a cutting process in advance of the cutting process, for example in order to be able to adapt the cutting parameters if the estimation result outputs a quality that is too low.

However, the estimation methods known from the prior art for estimating quality are subject to interference, which makes the estimation result less reliable, which in turn has a disadvantageous effect on the subsequent cutting process and its quality. In particular, the estimation methods are subject to temporal drifts (shifts) in long-term behaviour, sometimes due to ageing of the sensors and optics, wear and tear, etc. Estimation methods in particular have thus proved to be deficient, the data basis of which is static. A further disadvantage can be seen in the fact that the quality estimation is not individually adjusted to the respective laser cutting machine, the workpiece to be cut and/or the cutting environment.

Based on the prior art mentioned above, the object of the invention is to improve (online) quality estimation and, in particular, to make it more robust against interference and dynamically changing parameters. In particular, the quality estimation should be configurable based on the currently cut workpiece material, its alloy and/or surface and/or its thickness.

The above object is achieved by a method, a calibration module, a system and a computer program according to the appended claims. Advantageous embodiments, alternative features and their associated advantages can be found in the dependent claims.

According to a first aspect, the object is achieved by a method for calibrating a real-time estimator according to claim 1, which is intended for quality estimation of a cutting method using a laser cutting machine. The method may include the following method steps:
  loading a quality estimation result of the real-time estimator, which is based on a first sensor system, in particular an (online) sensor;
  providing a quality measurement result of the cutting edge of the workpiece, wherein the quality measurement result can be provided in particular by detecting measurement signals of a finished cut workpiece by means of a second sensor system, in particular a measuring device (e.g. offline camera);
  comparing the loaded quality estimation result with the provided quality measurement result and based on the result:
  calculating a calibration data set for calibrating the real-time estimator.

The terms used in this application are to be defined below.

Calibration here means an adjustment of the estimator, in particular periodically or recurrently according to a preconfigurable scheme, with feedback of the actually measured quality values. The calibration therefore does not refer to the cutting process, but only to the real-time estimator. Calibration can also be understood as a regulation.

The quality estimation preferably takes place in real time, i.e. during the cutting process and thus online. The quality estimation is carried out, so to speak, parallel to the movement of the laser cutting head over the sheet metal or the material to be cut. In a variant, however, the quality can also be estimated in a test cut and thus not on parts of the production batch. However, one advantage of the quality estimation proposed here is that the quality estimation is provided without a calibration or test cut and continuously in the ongoing cutting process. The quality measurement is carried out offline, i.e. usually after cutting. "Quality measurement" here means the calculation of the real and current cutting edge quality on the basis of measured signals, in particular optical signals (e.g. a camera image).

In a preferred embodiment, the real-time estimator is designed to execute an estimation algorithm. The estimation algorithm calculates the quality estimation result at least from detected sensor signals of at least one sensor. The estimation algorithm is known per se from the prior art. For example, reference is made here to EP2357057A1, in which a method is described for monitoring the quality of laser machining processes by detecting signals via optical sensors, such as photodiodes. Characteristic parameters are calculated from the signals using image processing methods, and a reference to the standard cutting quality is calculated for the corresponding parameters in order to estimate the quality. Another method is outlined in the work of Santolini, G. et al.: *Cut Quality Estimation in Industrial Laser Cutting Machines: A Machine Learning Approach, CVPR* 2019. Sensors and a DNN (deep neural network) are used here to draw conclusions about the cutting quality.

The estimation algorithm can also be designed according to the specifications as described in EP20 165 589.1, the content of which is referred to here.

The estimation algorithm of the real-time estimator can be designed using machine learning methods. In particular, the real-time estimator can comprise a model, preferably a convolutional network (CNN) with several hidden layers as network layers, in particular a convolutional layer (CONV), followed by an activation layer (ACT), followed by a pooling layer (POOL). This sequence (CONV, ACT, POOL) can be cascaded several times before one or more fully connected layer(s) and an output layer are interconnected.

The real-time estimator can preferably also have a time architecture in order to process and extract the information content that is in the temporal dimension of the process signals and thus enable a statement to be made about the signal profile over time. In order to map the signal sequence in the DNN in this case and thus to be able to learn time-dependent features, so-called gated recurrent units (GRU) or long short-term memory networks (LSTM) can be used in combination with the CNN.

In principle, there is a multitude of network structures, of which convolutional neural networks (CNN) and residual neural networks (RNN) are preferably used for the task at hand with camera images. For image sequences or temporal signals, temporal relationships or temporal features can be learned. Gated recurrent unit (GRU) and long short-term memory (LSTM) networks are suitable for this. It is advantageous to use a combined network that combines the above network structures in different layers.

The method according to the invention and in particular the calibration method including the calculation of the calibration data set can use a machine learning model. Provision can be made, for example, for the calibration model and/or the real-time estimator to be adapted using an action-reward learning algorithm, in particular using a reinforcement learning algorithm. An alternative particularly preferred embodiment is based on the fact that the calibration model and/or the real-time estimator is adapted to new materials (e.g. new alloys or other material thicknesses) by means of a transfer learning method in order to transfer the real-time estimator and/or model trained for a material of type A to a material of type B. Depending on which layer of the DNN the real-time estimator retrains the network, different abstract features can be reused. In a further development, the transfer learning method can also be used to transfer the calculated or learned knowledge to other types of processes, in particular cutting process types such as laser fusion cutting, laser flame cutting, laser-induced plasma cutting, plasma-assisted fusion cutting, or plasma-assisted flame cutting.

As an advantageous extension, the model can be supported by characteristic values, which are obtained directly from the sensor data using unsupervised learning methods. No quality measurements are required to calculate these supporting parameters. As a result, the essential process variations in the sensor signals or data can be recognised even if there are only a few quality measurements. Methods such as clustering, autoencoder, dimensionality reduction techniques such as k-NN/k-nearest neighbour, PCA/principal component analysis, etc. can be used.

The sensor data are preferably optical sensor data that are recorded during cutting (online) by a suitable first sensor system, hereinafter referred to as "sensor" (e.g. photodiodes, camera, OCT, acoustic sensors), i.e. during online process monitoring. This sensor data is transferred to the estimation algorithm as input data. As used herein, the term "sensor" is understood to be a sensor unit and may include multiple separate sensors of the same or different type. The sensor data (digital) or sensor signals (analogue) recorded in this way can be combined using a sensor fusion technique. The optional input data (if available) are material type, thickness, cutting process, laser power, cutting gas pressure, gas type, nozzle type/size, feed, nozzle spacing, focus position.

In a preferred embodiment of the invention, the detected sensor data and/or measurement signals are assigned to position identification data (position identifier) in order to be able to uniquely address and identify the data set and to be able to provide a spatial resolution. This is important in order to subsequently carry out the comparison on those data sets that have been acquired at the same position of the part and in particular the cutting edge. This is therefore important in order to be able to match (pair or assign) the measurement and estimation at the same position for the comparison step.

In a preferred embodiment of the invention, the first sensor system is implemented as an optical sensor, in particular as a camera arranged coaxially in the cutting head. Alternatively or cumulatively, the first sensor system or the sensor can also be an acoustic sensor or a sensor for detecting other signal types, such as a thermal sensor system with a pyrometric camera. The first sensor system or the sensor transmits sensor signals.

In a preferred embodiment of the invention, the second sensor system is implemented as a measuring device, in particular as an optical measuring device (e.g. as a camera) and can be used to record offline measuring signals at the cutting edge of the workpiece. "Offline" here means the sensory detection after the workpiece has been cut or after a partial cutting process, which is interrupted for the purpose of measurement and enables optical detection of the cutting edge. The second sensor system or the measuring device can be arranged in a downstream system for the laser cutting machine, such as a sorting system, a transport system and/or a bending system. However, the measuring device can also be accommodated in the laser cutting machine itself, in order to measure a cutting edge, for example and preferably intermittently, for cutting production parts. The measuring device can also be designed for the direct measurement of quality signals, as will be explained later (e.g. profilometer). The measurement device may be a multi-module device and may comprise a plurality of separate sensors, detectors, measurement modules of the same or a different type. The second sensor system or the measuring device delivers measuring signals.

The output data of the estimation algorithm include information on the cutting quality currently achieved in the cutting process. The cutting quality includes the following characteristics (not exhaustive), whereby some characteristics are also referred to as quality defects: Roughness, craters, burrs, slag residue, welding. The features are preferably output in quality classes. For example, 3 to 6 quality classes can be output, namely "very good", "good", "medium", "moderate", "poor". The type and number of classes can be configured in a configuration phase. Thus, the output data can be categorical. However, it is alternatively or cumulatively possible to specify both the burr height and the roughness with a continuous estimation number between 0 and 1 with numerical values in order to provide a more detailed estimation result. However, a quality class output is currently preferred.

Alternatively or cumulatively, it is possible for the estimation algorithm of the quality estimator to supply the direct quantitative characteristics, i.e., for example, the burr height in a unit of measure such as μm and/or the roughness in a unit of measurement. This simplifies the subsequent digital comparison with the quality measurement.

Alternatively or cumulatively, after the quality measurement it is possible to provide the quality measurement result of the cutting edge of the workpiece, the respective quality measurement result is subjected to an additional method step, namely a binning method that classifies the quality measurement results into appropriate classes according to the qualitative characteristics of the estimator. This can simplify the comparison between measurement and estimation for categorical values.

The steps of the method of loading, providing and comparing are preferably carried out in the order described. It is particularly preferred that the loading and the sensor signal detection with the sensor take place online, i.e. during a productive cutting process or on parts of the production batch, while the provision and detection of the measurement signals, in particular the cutting edge image of the finished cut part, by means of the measuring device in one subsequent time phase and in particular after completion of the cutting process. Alternatively, the detection of the measurement signals can also be integrated into the cutting process, as described above (interruption of the cutting process when the cutting edge is partially exposed).

The estimation algorithm is based on input data supplied from the sensor, preferably continuously. The provision of the quality measurement result is based on other input data supplied by the measurement device.

The activation of the measuring device can be triggered automatically by an activation signal from the calibration module or by manual intervention.

The comparison of the estimate with the measurement (both with regard to quality) and/or the calculation of the calibration data set is preferably event-based. In a first variant, the comparison and/or the calculation (of the calibration data set) is carried out continuously. In a second variant, the comparison/calculation is not always carried out, but only when required, in particular when preconfigured events occur. The events can be time-based or situation-based. In particular, a threshold can be configured. As soon as the comparison shows a deviation above the configured threshold value, the calculation of the calibration data set is triggered instantaneously and the calibration of the real-time estimator is preferably also triggered. However, it can also be configured that the calculation is suspended for a specific time phase, namely preferably when the deviations are below the threshold value and thus indicate that the estimation and measurement are compliant up to a likewise pre-configurable tolerance range and no adjustment of the estimator is required is.

The calculation of the calibration data set can be initialised or triggered by different events, such as the provision of new measured values, the completion of a cutting process, after timed events or after predefined events (if, for example, a certain area of a workpiece sheet is cut or if the deviation exceeds a exceeds threshold or other configurable events). This can be implemented in a trigger component. This saves computing capacity since the comparison is only performed when it is required. In one embodiment of the invention, the calculation of the calibration data set can only be carried out if the real-time estimator requests a calibration.

The calibration of the real-time estimator can also be event-based and/or triggered when changed calibration data occur.

The detection of measurement signals of a cutting edge of a finished cut workpiece can be configurable. Thus, the capturing of the image can be initiated according to a time or event pattern, such as after specific time intervals. Alternatively or cumulatively, the reading out of the sensors (photodiode or camera) can be configured and carried out according to a specific time schedule.

The calculated calibration data set is preferably forwarded directly to the real-time estimator and/or a separate real-time module connected downstream of the real-time estimator in order to recalibrate this and/or the quality estimation result. In an advantageous embodiment of the invention, the calibration data set includes an offset that is applied to the quality estimation result of the real-time estimator. In the simplest case, the calibration data set includes new setting values for adapting the real-time estimator. It is thus possible to dynamically subject the real-time estimator to continuous readjustment and also during a cutting process.

In a further preferred embodiment of the invention, the calibration data set contains the trained parameters of the calibration model, which has been trained with quality estimation results and quality measurement results assigned to one another.

The quality measurement result is preferably evaluated by capturing an image of the cutting edge of a part after cutting by means of the measuring device. The assessment can be performed automatically using image processing methods. Alternatively or cumulatively, machine learning methods can be applied to the recorded cutting edge images. Alternatively or cumulatively, the captured images can also be evaluated manually with regard to configurable quality criteria, in that the cutting edge is examined by a user. The operator can then provide his assessment result to a digital processing unit via a user interface. Certain buttons can be offered to him/her for this purpose. In this case, the quality measurement result can be provided by an input data set via a user interface. This can be carried out in particular if the image detection and the automatic, algorithmic image assessment failed due to an error.

Alternatively or cumulatively, the quality measurement result can also take place without imaging by means of a measurement in an automated manner by measuring the cutting edge in order to directly measure the optically detectable quality parameters, such as groove depth, groove frequency, roughness and/or burr height. For this purpose, optical and/or mechanical measuring devices can be used to measure the roughness (profilometer) and/or to measure the burr (gradiometer). In particular, an optical 3D measuring system can be used, which works in particular according to the principle of focus variation. The focus variation is an area-based method for optical, high-resolution 3D surface measurement in the micro and nano range. The technology combines the functionalities of a roughness measuring device and a coordinate measuring system. The roughness is measured according to the DIN EN ISO4287 standard. Different roughness parameters are distinguished. Suitable for laser cut surfaces are: Ra average profile roughness, Rz average profile roughness, Sa average surface roughness.

In one variant, the method or the calibration module is designed to detect discolouration (e.g. an oxide layer) of the cutting edge, which is also detected by means of optical image detection.

The laser cutting machine is preferably a system that is used in the field of industrial production. The laser cutting machine can, for example, contain a fibre laser or a CO laser with appropriate wavelengths. Fibre lasers are commonly operated at near-infrared wavelengths, typically 1070 nm. Their power today is at least 2 kW. The maximum output used in industry is currently around 30 kW, and this trend is rising. The beam parameter product (BPP) is typically around 3-4 mm mrad, at maximum power somewhat higher. CO2 lasers can be operated with a wavelength of 10.6 µm at a power of 2-10 kW and a beam parameter product of around 10 mm mrad.

In a preferred embodiment, the activation of the sensor and the activation of the measuring device do not take place synchronously and in particular according to a different scheme. In particular, the sensor is continuously activated and the measuring device can only be switched on and/or activated sporadically and when required. In addition, the two image detection devices (sensor, measuring device) are preferably separate devices. The image capturing devices mentioned can be arranged at different positions and/or on different devices or components. The sensor is typically arranged in the laser machine and preferably in the laser cutting head, and the measuring device is arranged separately and preferably in a mobile terminal device and/or on a handling system, such as a sorting system. Both image detection devices are designed with suitable data interfaces to the calibration module and to the real-time estimator.

In a preferred embodiment, the sensor can be designed as an optical sensor and in particular as an in-process camera and/or as a photodiode unit and/or as an acoustic sensor. The sensor is the basis and provides the input signals for the real-time estimator (also referred to as 'estimator' in the following), e.g. in the form of photodiode signals.

The measuring device can include one or more sensors, preferably optical sensors. The measuring device can be at least one camera, for example, in particular a camera that is attached to or assigned to a mobile terminal device and/or an automation system (sorting system). The measuring device is a device that is used for quality measurement and serves to provide the quality measurement result.

As explained above, the sensor and the measuring device are preferably two separate and distinct units. In particular, the measuring device can be an optical detection device in a mobile device, such as a smartphone with a camera, which the user carries with him/her. An app can be installed on the smartphone or comparable mobile terminal (e.g. tablet) that automatically carries out a quality assessment based on the captured image.

In an alternative embodiment, the measuring signals of the measuring device can also be recorded intermittently for the cutting process. For this purpose, after a cutting process or partial cutting process, which at least partially exposes a cutting edge, a (preferably automatic) nozzle change can be carried out, which includes a deflection mirror arranged on the nozzle in order to capture the exposed cutting edge from the side when viewed from above. In this case, the measurement signals are recorded using a measurement device that is configured on the laser cutting machine, in particular on the cutting head. In the latter case, the device that observes the process zone and detects sensor signals during cutting (sensor) can be the same that later detects the cutting edge of the cut workpiece (measuring device). The sensor is preferably intended for image signal detection. For this purpose, the image signal can be captured either in a productive cut or in a calibration cut.

In a further preferred embodiment, the detection of measurement signals, namely quality measurement signals of the cutting edge, can be configured with regard to an execution time and/or execution type. In particular, the point in time, the frequency or the number of recordings by the mobile terminal (e.g. mobile phone camera) can be configured depending on the respective application. For example, if an error-prone component needs to be cut, then it may need to measure and record more frequently, and vice versa. In addition, detection parameters such as exposure time, focus, etc. can also be varied if necessary. The detection of signals, e.g. from at least one image, and/or the provision of the quality measurement result can be controlled sporadically at configurable intervals or according to a configurable pattern or based on events (e.g. from the status of the sorting or machine handling system).

In another preferred embodiment, a calibration data set is calculated only when deviations are detected that exceed a preconfigurable threshold value. This has the advantage that calibration data does not have to be transmitted unnecessarily and calibration procedures do not have to be executed on the estimator.

In another advantageous embodiment, metadata is assigned to the detected sensor signals and/or measurement signals and/or stored in an assigned way. Metadata can concern, for example, the time of detection, a part number, but also a workpiece material (alloy, thickness, etc.). Valuable information can be derived from the metadata on the recorded sensor signals. For example, patterns can be recognised and compared with the cutting plan. For example, when estimating, it can be automatically taken into account that the quality—without changing the cutting parameters—changes over the trajectory and, for example, would be lower with narrow radii than with straight cuts. This can, for example, cause the sensor to be activated more frequently in these areas. Alternatively or cumulatively, metadata relating to the recorded measurement signals of the measuring device can also be taken into account when calculating the calibration data set (e.g. information on the identification of the part, the workpiece and/or time information, etc.).

In principle, metadata can also be loaded from other sources (e.g. from the cutting plan) and made available to the calibration module as input data and included in the calculation of the calibration data set. In the simplest case, a table can be created with all the calibration data sets calculated for different material alloys. If the same material alloy is later cut again, the corresponding calibration data set can be loaded before the start of cutting, which means that the real-time estimator is calibrated as best as possible right from the start of cutting.

In a further development and advantageous embodiment, the calibration data set is calculated specifically for the material and/or the cutting process. Material-specific information can include information on the type of material (e.g. alloy such as St37 or S235 as inexpensive sheet steel or e.g. Ruukki laser as high-quality laser sheet), material thickness and/or surface characterisation (e.g. uncoated or stained, or sandblasted or scaled). Cutting process-specific can include information on the cutting process, such as fusion cutting, flame cutting, laser-induced plasma cutting, plasma-assisted fusion cutting or flame cutting, etc. However, cutting-process-specific also means that essential process parameters of the cutting machine are included in the calculation of the calibration data set. The inclusion of process parameters is particularly advantageous when a calibration model is used and can in particular be used directly as additional input both when training the calibration model and for its real-time application downstream of the real-time quality estimator. Essential process parameters are: Laser power, feed, focus position, cutting gas pressure and nozzle spacing.

In another advantageous embodiment, a calibration model is used to calculate the calibration data set, which in the simplest case has preferably been trained with quality estimation results and quality measurement results assigned to one another in order to calculate a calibrated quality estimation result for a current quality estimation result.

A model that is common in artificial intelligence or in machine learning is preferably used as the model (here for 'calibration model'), which has been trained using methods of supervised learning. The calibration model can be trained by additionally using stored intermediate results of the real-time estimator as training data and in particular intermediate results of the real-time estimator in the form of activation values of neurons of a convolutional neural network (CNN) arranged in front of an output layer.

The model can preferably include an artificial neural network (ANN), an MLP (Multi Layer Perceptron, a regression model, regression or classification tree, a support vector machine (SVM), random forest, gradient boosted tree or be combined from the models mentioned (something using an ensemble learning method). The input data and training data are not image data, but two independent variables: estimated value and measured value. The output data includes a calibrated estimate and/or a calibration data set. Basically, there are different implementation options. An MLP (fully connected) can be used equivalently to a regression model, although the latter has advantages in terms of implementation because it is simpler. It should be noted that a variant of the calibration model can also be used. In the variant, intermediate results of the real-time estimator (activation values according to CNN layers) are also used. An MLP and/or a flexible model (SVM, random forest or similar) should be used here.

The model can include a regression model, advantageously a second-order linear regression model. This is very easy to use with a few input variables (up to approx. 10) and can also map non-linearities and interactions between two parameters. The training requires only little computing power because it uses here the least squares method (OLS, ordinary least squares), which does not require iterations.

Flexible calibration models, such as the Support Vector Machine, SVM, are preferred. Alternatively, a random forest (multiple decision tree) or a model fitted using XGboost (gradient boosted tree) could also be used.

An ensemble learning approach can preferably be implemented. In an ensemble, several models are trained and evaluated simultaneously at runtime, for example by averaging the output values (for regression) or by majority voting (for classification) to achieve increased accuracy or an improved prediction.

The model can also be in the form of a statistical model or include one.

The calibration model is preferably trained in order to calculate calibrated quality estimations from the quality estimations originally provided by the real-time estimator. The calibration model can be trained by storing intermediate results of the real-time estimator together with assigned quality measurement result data as training or input data are used. Intermediate results of the real-time estimator include in particular the features of a CNN extracted by means of learned, i.e. parameterised filters (kernels), i.e. the activation values of neurons from or after convolutional neural network layers (CONV layers), which are before the layers of the classifier (fully connected output layer) are arranged. The filter kernels are the parameterised kernels of the CNN and are normally unchangeable at runtime or in online operation, i.e. while the first sensor technology continuously supplies real-time data in cutting operation and the real-time estimator estimates the quality from this, while the activation values (of the corresponding CONV layer) represent the values calculated in online mode with the filter kernels (of the corresponding CONV layer) from the current real-time image data. However, the filter kernel can be adapted by retraining the real-time estimator, for example by means of transfer learning or by means of action-reward learning, in particular by means of reinforcement learning. With new materials, sheet thicknesses and/or new cutting processes, the more complex methods of transfer learning allow learning of new correlations in the signals of the process sensors versus the production-significant quality characteristics even during ongoing production, which thus increases cognition and performance of online quality estimation means.

The input data of the real-time estimator are the sensor signals, in particular the process sensors, i.e. mainly the signals of the in-process camera and/or the photodiodes. Alternatively or cumulatively, other sensors can be used, such as a light field camera and/or acoustic sensors. The output of the real-time estimator is the calculated quality estimation result.

In principle, one advantage of the method presented here is that it can be used without the execution of calibration cuts. These can be optional, but not mandatory. The real-time estimator and the steps of the method, in particular the loading, the provision and the comparison, can optionally be carried out after a calibration segment has been carried out. For example, the detection of signals of a cutting edge can be carried out on a calibration cut or without a calibration cut and directly as part of the execution of a cutting plan.

The detection of measurement signals and preferably optical measurement signals of an image generator can be done via a deflection mirror and/or in particular also intermittently to the cutting process (online). The detection of the measurement signals can also preferably take place intermittently. This has the advantage that it is not necessary to measure the edge outside of the cutting machine, since the edge could already be measured intermittently for the cutting process. For this purpose, a calibration cut can be made at the edge of the metal sheet, for example, or a picture of the cutting edges can be made directly with the sensor (first sensor system) in sections whose inner parts have fallen through the cutting grid using a deflection mirror.

The achievement of the object has been described above in terms of the method. Features, advantages, or alternative embodiments mentioned in this way can also be applied to the other claimed subjects and vice versa. In other words, the present claims (which are directed, for example, to a system or to a calibration module or to a computer program) can also be further developed with the features described and/or claimed in connection with the method. The corresponding functional features of the method (e.g. loading) are thereby formed by corresponding modules, in particular by hardware modules or microprocessor modules, of the system or of the product (e.g. load interface), and vice versa.

According to a further aspect, the invention relates to a calibration module for calibrating a real-time estimator according to claim 19, which is intended for quality estimation of a cutting method using a laser cutting machine, comprising:

a load interface for loading a quality estimation result of the real-time estimator;

a first processor, which is intended to provide a quality measurement result of the cutting edge of the workpiece, wherein the quality measurement result can be provided in particular by detecting measurement signals of a cutting edge of a finished cut workpiece by means of a measuring device;

and wherein a second processor is intended to compare the loaded quality estimation result with the quality measurement result and is based on the result, in particular on detection of a deviation:

is intended to calculate a calibration data set for calibrating the real-time estimator;

an output interface which is intended to output the calculated calibration data set.

In a further aspect, the invention relates to a system with a real-time estimator and a calibration module, as described above, to be used for a laser cutting machine. The real-time estimator and the calibration module can be designed as a distributed system and do not have to be implemented in the same structural unit. This creates significantly more flexibility and computationally intensive processes such as the calculation of the calibration data set and/or the calibration of the real-time estimator can be outsourced to powerful servers. In particular, the second processor for comparing and calculating the calibration data set, as well as the first processor that delivers the quality measurement result, can run locally on a computer on the machine, or they can also run as a network service or, in particular, as cloud-based services. This means that computationally intensive steps, such as training a large calibration model or a complete retraining of the online quality estimator, do not have to take place locally on the machine. Another advantage of a cloud-based solution is that training data is collected centrally and production systems can potentially benefit from each other through a greater variety of materials to be cut.

In a preferred embodiment, the system comprises or is in data communication with a sensor. The sensor can preferably be designed as an in-process sensor, e.g. a camera.

The calibration data set is used to calibrate or readjust the real-time estimator. A simple readjustment is simply adding an appropriate offset to the real-time quality estimation. The difference between the measured or actually determined value and the estimated value is formed for each quality parameter, such as roughness or burr. If several cutting edges were photographed, all difference values of the same characteristic value are averaged. With the next cutting job, the averaged differences are added as an offset to the characteristic values of the real-time quality estimation. This compensates for the previous deviation and the cutting quality can be more accurately estimated in real time.

The advantage of this simple method is that only the characteristic values of the real-time estimate have to be stored for each cutting edge to be photographed and no complex calculations have to be carried out to correct the real-time estimate.

Another method for readjustment provides that for each photographed cutting edge all determined or measured quality parameters or quality measurement results as labels (Y values) and all estimated values or quality estimation results of the previously stored real-time quality estimation as explanatory values (X values) are used overall as input values for training a calibration model. A calibration model is therefore trained with the above-mentioned data for the readjustment. The result of the training is a parameterisation of the calibration model, which is optimally adapted to the cut sheet metal.

With the next cutting job, the real-time quality estimations of the sensors are corrected in real-time by the calibration model that has now been trained. The advantage of this further development is that non-linear relationships between the original real-time estimates are mapped in the calibration model, making the readjustment more accurate.

A further method for readjustment consists in additionally using the stored intermediate results of the real-time quality estimation as input variables for training the calibration model. When using a deep neural network (DNN) as a real-time estimator for the cutting quality, interim results of the real-time quality estimation are the activation values of the neurons after the layers, e.g. of a convolutional neural network (CNN), which are before the output layer/classifier available. Compared to the original sensor data, these intermediate results contain very strongly compressed information on the quality parameters. A classic neural network, which consists of fully connected (fully connected) layers, should be mentioned as a possible classifier. The advantage of this method is that the input data for training the calibration model is higher-dimensional and the readjustment can be carried out more precisely. In addition, access to the intermediate results of the real-time quality estimation enables a better generalisation of the readjustment to be achieved even for slightly changed material composition and sheet thickness.

Another method for post-adjustment is that the real-time quality estimator is post-trained directly, without separately using a calibration model. For this purpose, the identified quality characteristic values of the in-situ measurement, i.e. the quality measurement result, are used as a label and the assigned stored original sensor data are used overall as input data for the post-training. As a result, good calibration can be achieved even when using a DNN as a real-time quality estimator with relatively few new data.

Another advantage of the last two methods is that they can be used to implement transfer learning. In artificial intelligence, transfer learning refers to the task of transferring knowledge learned from a specific domain to another domain. The learned knowledge, which is initially available in the real-time quality estimator and may have already been specialised through previous retraining, can therefore be applied to new materials and sheet thicknesses as well as cutting process types (laser fusion cutting, laser flame cutting, laser-induced plasma cutting, plasma-assisted fusion cutting) with the same method if sufficient new data is available, plasma assisted flame cutting).

It is particularly advantageous if, with new materials, the in-situ quality measurement (using a measuring device) can in turn be readjusted by the operator depending on the situation, so that it can determine the quality features desired by the operator in the desired form.

A further development of the above methods for readjustment is that the correction values or the parameterisation of the calibration model or the retrained real-time quality estimator for each cut material and sheet thickness and, if necessary, other distinguishing features (such as material composition or alloy, surface, cutting process settings) get saved. With the next cutting job, the appropriate correction values or the appropriate parameterisation of the calibration model or the appropriate post-trained real-time quality estimator are reloaded according to the currently loaded material, sheet thickness, etc. As a result, the real-time quality estimation can be carried out very precisely for the specific material and any quality losses are reliably detected from the start of the new cutting job.

A further development of the above methods for readjusting the real-time cut quality estimation consists in implementing the readjustment process as a continuous action-reward process (action-reward). This means that instead of a complete retraining of the entire real-time quality estimator or the calibration model, a model adaptation of the real-time quality estimator is carried out for each in-situ measurement of the cutting quality by means of reinforcement learning. In this further development, this would advantageously directly affect the parameters of the DNN of the real-time estimator. The reinforcement learning algorithm can then adjust the many parameters of the DNN so that it estimates better. This eliminates the recurring retraining, which is advantageous for short intervals of in-situ measurements and without having to forego the more complex methods.

With the methods explained, it is therefore possible to measure the cutting quality online or in real time with reliable accuracy, even under unfavourable production conditions with variable influencing factors. With new materials, sheet thicknesses and cutting processes, the more complex methods of transfer learning allow the learning of new correlations in the signals of the process sensors versus the production-significant quality characteristics even during ongoing production, and thus a growing cognition and performance of the real-time quality estimation.

If the measuring device is not implemented or is arranged in an unfavourable position, the operator can also manually hold the cut part in front of the camera or even in front of the sensor.

If the determined cutting quality is not satisfactory, the cutting parameters (laser power, laser beam focus position, cutting gas pressure, etc.) can be changed to improve the cutting quality. If a real-time quality estimation is implemented, the change in cutting quality can be determined immediately when changing the cutting parameters. If no real-time quality estimation is implemented, the change in cutting quality due to the change in cutting parameters can only be checked in the next cutting plan. No human intervention is required for the control of the cutting parameters mentioned using the determined cutting quality (in a 'closed loop').

In principle, the term "offline" or offline quality determination is to be understood as the quality measurement or determination that is not carried out during cutting, but is carried out on a finished cut part, in contrast to online quality estimation, which takes place during the cutting process.

In a variant, the offline quality determination can also be carried out on the cutting table as follows instead of with the handling system. A calibration cut (rectangular hole) is made and the cut quality is determined using a special nozzle with a 45° mirror (similar to a dentist's mirror), which is used with a nozzle changer, using the cutting head camera, i.e. in-process camera. The burr in the area of the lower edge could also be measured with the mirror. The advantage of this variant is that this can be done at the beginning and/or during the cutting process and thus the part quality can be optimised immediately. Under certain circumstances, the rectangular hole must be removed from the sheet metal using a device or waste shredding is used to ensure that the cut-out is actually free for inserting the mirror.

Another variant of being able to carry out the offline quality determination (measuring device) directly on the cutting table of the laser cutting machine instead of with the clearing robot or with the sorting system can be carried out as follows: Make a calibration cut at the edge of the sheet. The cut out area falls down. The exposed cutting edge is photographed from the side with the measuring device, e.g. with a camera built into the machine. This allows the cutting quality to be determined from the images directly before cutting, or a few times during cutting. The determined offline cutting quality can then be used to update the real-time estimator of the cutting quality, or directly to adapt cutting parameters, i.e. to optimise the cutting quality.

The advantage of this variant is that the image quality is always the same and that no special nozzles and nozzle changers are required. Furthermore, the calibration can take place at the beginning and/or during the cutting process and thus the part quality can be optimised directly.

If it turns out that certain material properties (chemical composition, rolling direction, cold/hot rolled, surface structure and texture, etc.) lead to characteristic real-time estimates as well as offline quality measurements, this correlation could be used to estimate the material properties mentioned above. These could then also be passed on to a subsequent system, such as a bending machine. With this information, the bending machine can, for example, calculate the elastic resilience of the material and thus bend the first part correctly (by correctly selecting the necessary overbending).

Another way of achieving the object provides a computer program, with computer program code for performing all the method steps of the method described in more detail above when the computer program is executed on a computer or is loaded into a processor of the computer. It is also possible that the computer program is stored on a computer-readable medium. In a preferred embodiment of the invention, the computer program implements the method described above and can optionally implement the aforementioned further developments.

In the following detailed description of the figures, non-limiting exemplary embodiments with the features and further advantages thereof will be discussed with reference to the drawings.

BRIEF DESCRIPTION OF THE FIGURES

In the figures.

DETAILED DESCRIPTION OF THE INVENTION

The invention relates to a calibration tool or module and method for calibrating a real-time estimator ES for estimating the quality of a cutting result of a laser cutting machine L.

Figure 1:
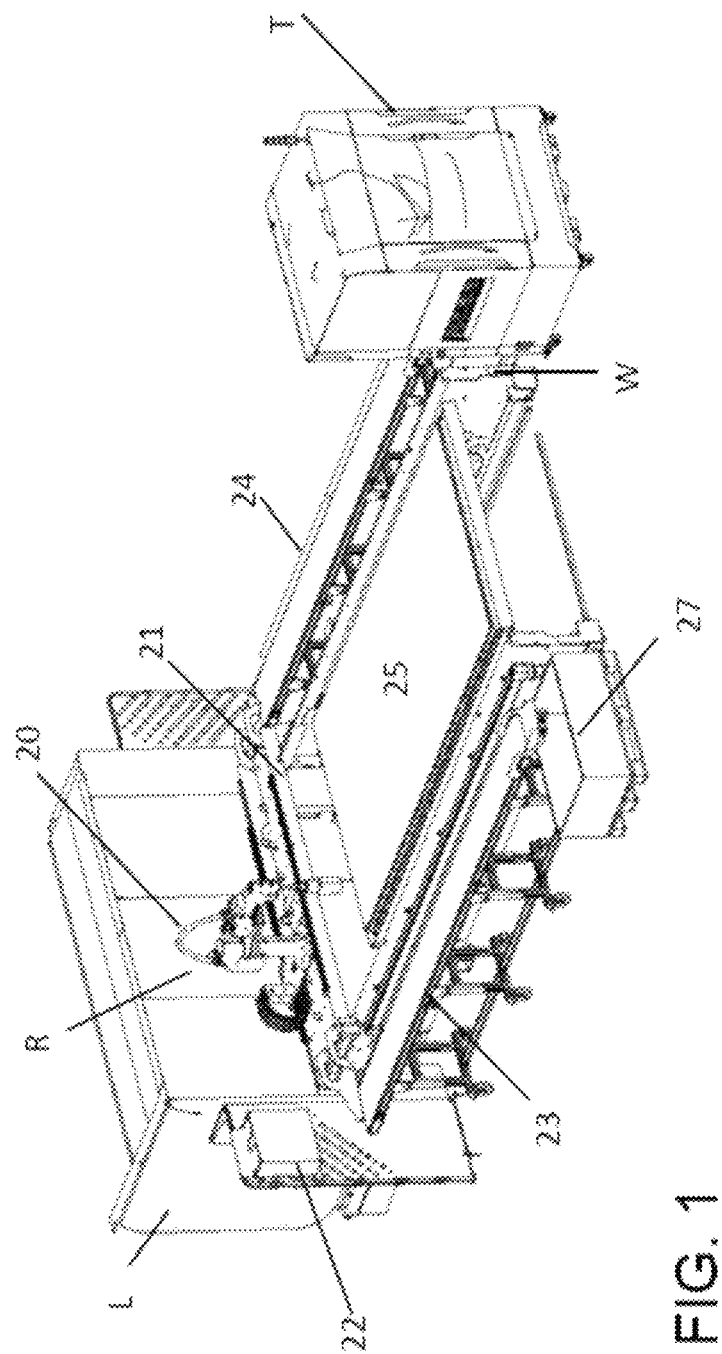
FIG. 1 shows an exemplary sketch of a cutting system with assigned handling systems.

FIG. 1 schematically shows a laser cutting system with a shuttle table W, which is intended for feeding and removing the workpieces into and out of the laser cutting machine L. The system also includes a clearing robot R and a parts sorter T. The parts sorter T already has a camera with which the cutting quality can be estimated in addition to part recognition. The system can comprise two conveyor belts 23, 24. The shuttle table W is used to hold the workpiece. The system may include an unloading pallet 27. Reference sign 21 denotes a sorting bridge with at least one conveyor belt. Reference sign 22 designates a control panel which includes a user interface. The unloading robot 20 serves to unload the parts from the shuttle table W after they are cut.

Figure 2:
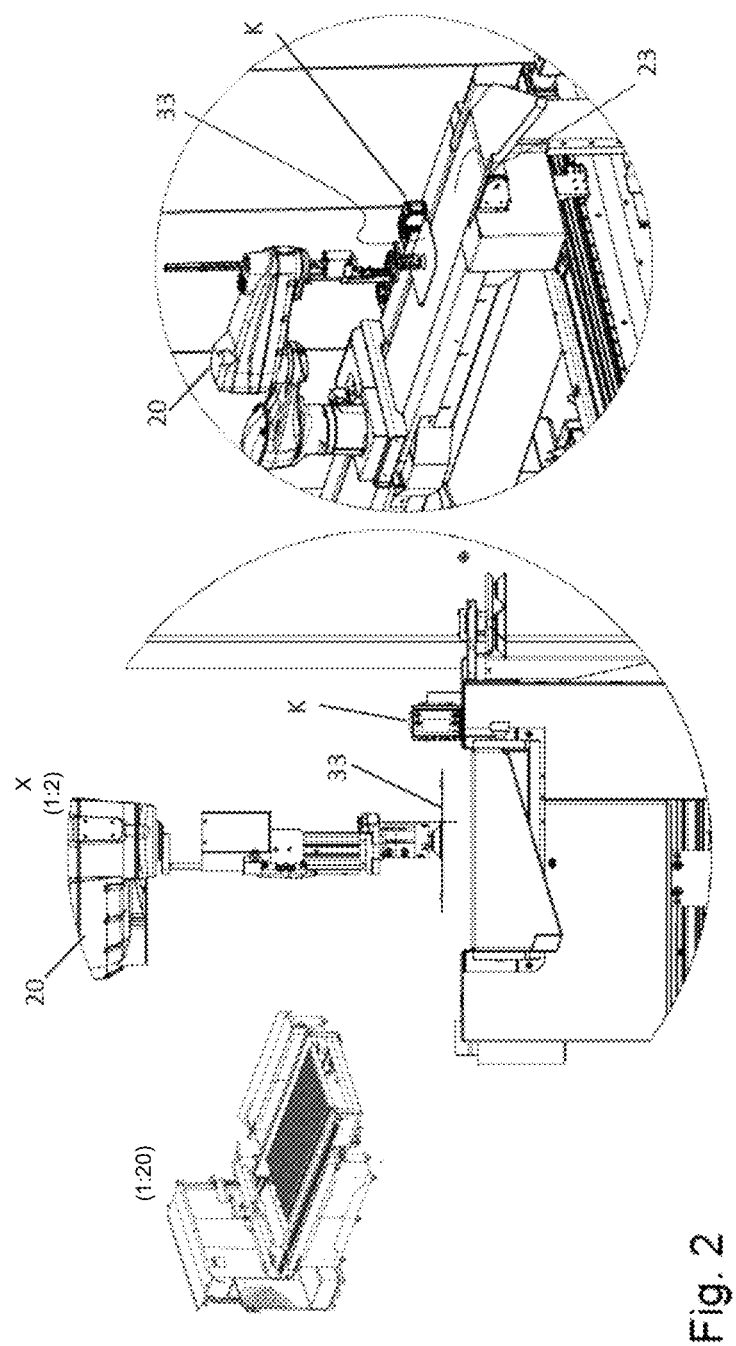
FIG. 2 shows a further representation of a cutting system with an integrated camera system, which serves as a measuring device.

FIG. 2 shows a similar system with a clearing robot R including a camera system K, which is also used to capture cut surface images. The unloading robot 20 can comprise a gripping arm, in particular a sucker, in order to lift a cut part 33 to be measured and sorted. The system may include a parts chute 31 which may be located at the sorting bridge.

A typical process is described below.

A cutting plan for a metal sheet is loaded. The machine control system identifies the first straight cut that is suitable for the in-situ camera recording of the cutting edge (measuring signals from a measuring device). A straight cut a few cm long is suitable so that the quality parameters can be adequately averaged. The cutting process should also be stationary, i.e. the cutting head should not accelerate along the selected route. If this straight cut is carried out, the process monitoring signals, which also include camera recordings of the processing zone by means of a sensor D, as well as the cutting quality q' estimated therefrom (in particular burr height and roughness) are stored. The meta information on the sensor signals is also saved, i.e. the coordinates and time of the selected cut and the consecutive part number, as well as the interim results of the real-time cutting quality estimation explained below.

If a cutting plan is loaded, it can be determined which parts or which cutting edges are suitable for offline measurement. The cutting edge should ideally meet the following criteria, according to which the selection parameters are to be set.

cutting edge of a not too heavy, easily tradable part
straight cutting edge of at least 1 cm in length, so that the quality parameters can be adequately averaged.
cutting edge where a stationary cut prevailed, namely no cutting head acceleration occurred.

The following parameters can be selected from all the cutting edge sections per cutting plan that meet the above criteria:

selection in such a way that the offline measurement (measurement 2 using a measuring device) does not result in a time delay/loss of productivity.
selection in such a way that the offline measurement results in a maximum xy % loss of productivity, whereby the xy value can be set.

Depending on the selected xy % value, the selected cutting edge sections are evenly distributed over the cutting plan.

In a preferred embodiment of the invention, a poor measurement result from the sensor (online) can also be compensated for with a measurement result from the measurement device or the camera (offline). If the quality estimation of measurement 1 (using sensor D) indicates poor quality, this measurement 1 is saved and the part/cut is later measured using sensor 2 (measuring device K). This also gives data from bad cuts, or according to measurement 1 bad cuts and the calibration model can be trained over a larger quality range, which increases the accuracy of the calibration. As a result, the proportion of pseudo errors (false positives: measurement 1 shows bad, measurement 2 shows good) can be reduced.

Once all the parts have been cut across the entire metal sheet, the cut metal sheet is transported to the machine and out to the sorting table using an automatic shuttle table. A robot arm and a camera K are present at the sorting table. The robotic arm sorts the cut sheet metal, stacking the different pieces in appropriate bins (or pallets). If the part for which the suitable cutting edge has been identified for the purpose of in-situ measurement and whose coordinates are known is taken by the robot arm, the selected cutting edge is supplied to the camera K before stacking. The cutting edge is then photographed in a suitable way, for example from different directions. The cutting quality can be determined or measured in a known manner from the photographs.

Now the real-time quality estimation based on detected sensor signals and the (in-situ) quality measurement based on measurement signals can be compared. If the two quality values deviate from each other only within acceptable tolerances, typically <10% (the threshold can be parameterised), then the real-time estimation does not need to be readjusted. If the deviation is larger, the real-time estimate should be calibrated in a suitable way.

Figure 3:
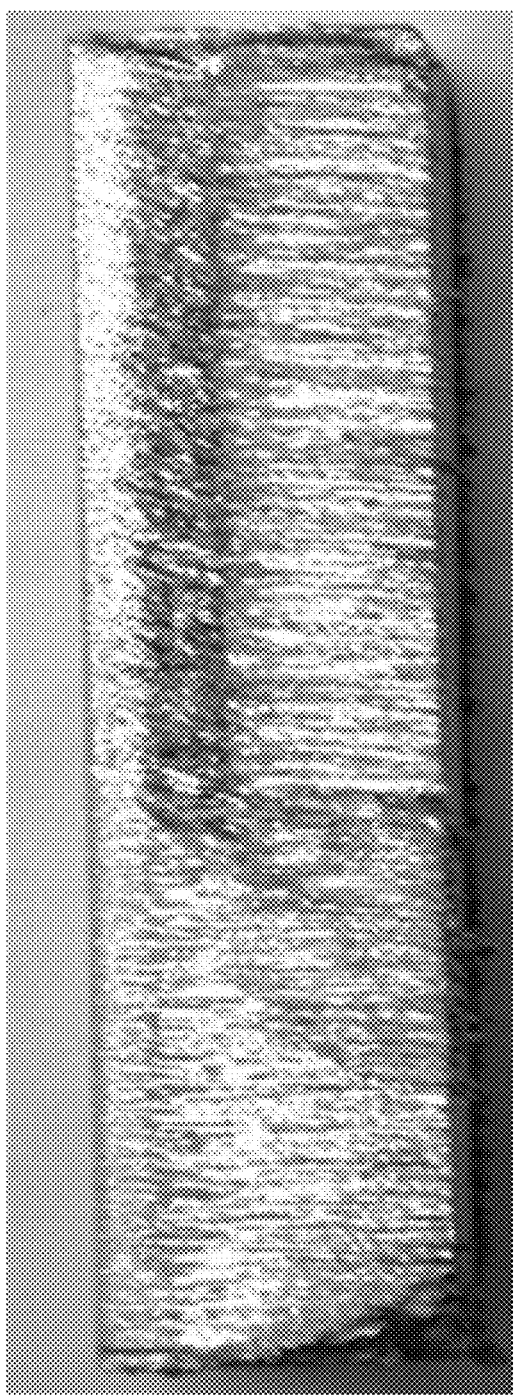
FIG. 3 shows a photo of two cutting samples with cutting edges of differing quality.
Figure 4:
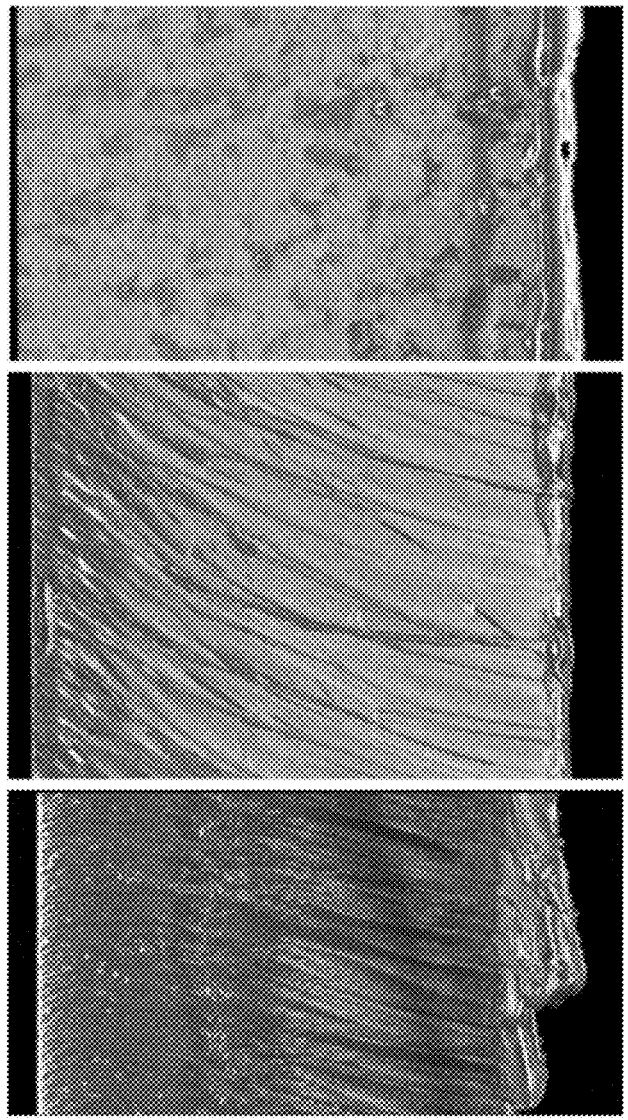
FIG. 4 further representations of cutting samples of differing quality.

FIGS. 3 and 4 show cutting edges with different cutting qualities. The respective qualities can be clearly distinguished. Thus, in FIG. 3, the roughness is obviously less on the left than on the right. FIG. 4 shows photos of several cutting samples with different cutting quality. In particular, the strong formation of ridges is evident on the left, while only a slight ridge is present in the middle image. The image on the right shows a cutting edge from below, whereby the formation of burrs can also be clearly seen here. Images from the side (left and middle) as well as from the bottom (right) can be used for the offline quality measurement. Other perspectives are also possible. Samples of known quality (e.g., far left and/or far right) could also be used to calibrate an offline quality measurement based on camera images.

Figure 5:
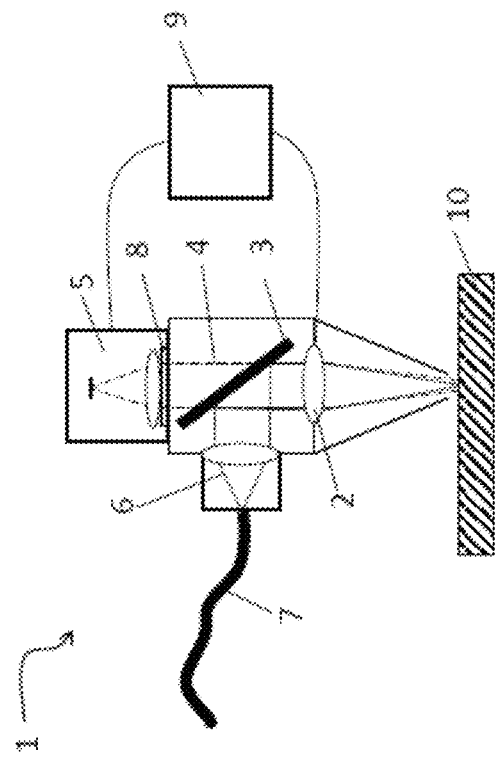
FIG. 5 shows a schematic representation of a laser processing head with a process monitoring unit.

FIG. 5 shows an exemplary cutting head 1 with an exemplary sensor system 5 in the form of a coaxial camera for carrying out a first measurement or for acquiring sensor signals, which leads to the quality estimation result of the real-time estimator ES. The exemplary cutting head also shows the focusing lens 2 for the working laser beam 6, which is guided to the cutting head via transport fibre 7, the dichroic deflection mirror 3 for the purpose of decoupling the process observation beam path 4 for process observation via process observation unit/camera 5, apertures and/or filters for process observation optimisation and a unit 9 with which cutting parameters can be adapted, shown as an example using an automatic focusing lens adjustment. The workpiece is marked with reference sign 10.

Figure 6:
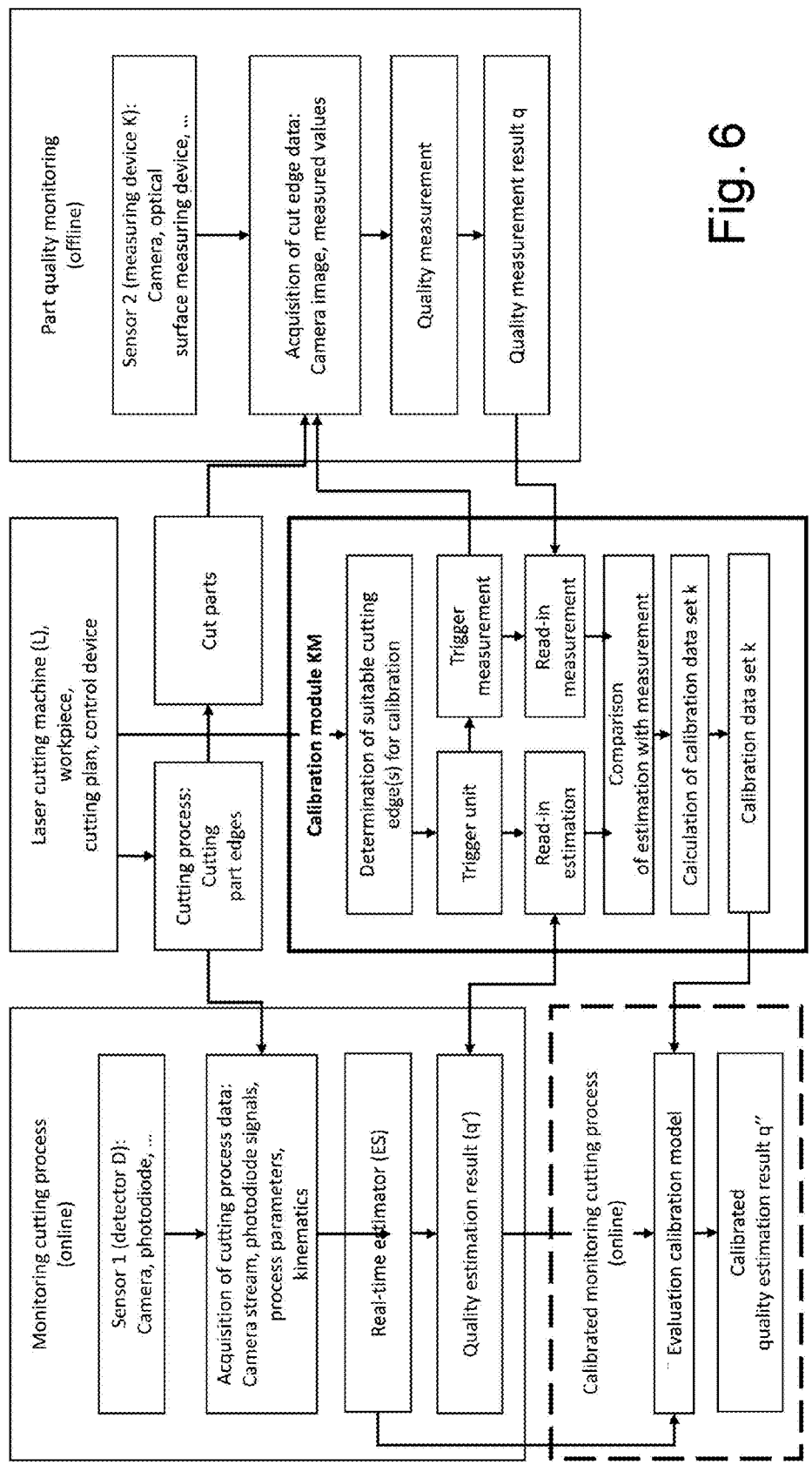
FIG. 6 shows a schematic overview drawing of the architecture of components according to a preferred embodiment of a calibration system of the invention.

FIG. 6 shows the calibration system according to a preferred embodiment. A calibration module KM is the focus of the invention and is used to calibrate the real-time estimator ES.

As shown in FIG. 6, there are two monitoring processes:
1. an online process during the cutting, in which the first sensor system with the sensor or detector D is active (left side in FIGS. 6) and
2. an offline process after cutting, in which the second sensor system with the measuring device, in particular the camera K, is active (right side in FIG. 6).

The sensor signals from the sensor (online) are supplied to the real-time estimator ES so that it can output the quality estimation result. The measurement signals from the measurement device, in particular from the camera K, are recorded and algorithmically calculated to calculate the quality measurement result q.

In particular, the calibration model is evaluated or applied or evaluated online in the calculation cycle of the real-time estimator ES with quality estimation results q' and the calibration data set k as input (and any intermediate results). It is trained in the calibration module; this is marked in FIG. 6 with the box "calculation of calibration data set".

As indicated in FIG. 6, an optical sensor system (e.g. camera) does not necessarily have to be used for the sensor (online, first sensor system) and/or for the measuring device (offline, second sensor system). Alternatively or cumulatively, other sensor types can be used, acoustic sensors, a profilometer, etc. Another advantage can be seen in the fact that the first and second sensors do not necessarily have to be identical. It is thus possible for the first sensor to be a module made up of different optical detectors (camera, photodiodes), optimised for use as fast online sensors. The second sensor with the measuring device, on the other hand, is optimised for recording the offline cutting quality, for example using a high-resolution camera. The advantage of a camera as a second sensor is that it allows the cut surfaces to be recorded quickly, which is a requirement, for example, when unloading with a robot. Nevertheless, an optical measuring device for detecting the surface topography, or a mechanical measuring device for measuring roughness (profilometer) or another mechanical measuring system can also be used as a second sensor system. Both detected signal types are then algorithmically converted into a result, namely into the quality estimation result and the quality measurement result, which can then be compared again.

As shown in FIG. 6, the calculated calibration data set k can also be used to evaluate the calibration model. This serves to provide a calibrated quality estimation result q".

FIG. 7 again shows the interaction between the quality estimation result and the quality measurement result in a schematic manner. The calibration module KM calculates a calibration data set k from the loaded quality estimation and quality measurement result. In the simplest case, this can be an offset that is applied to the estimate as a calibration. For the next cut, a calibrated estimator can already be applied to provide more accurate estimates.

Figure 7:
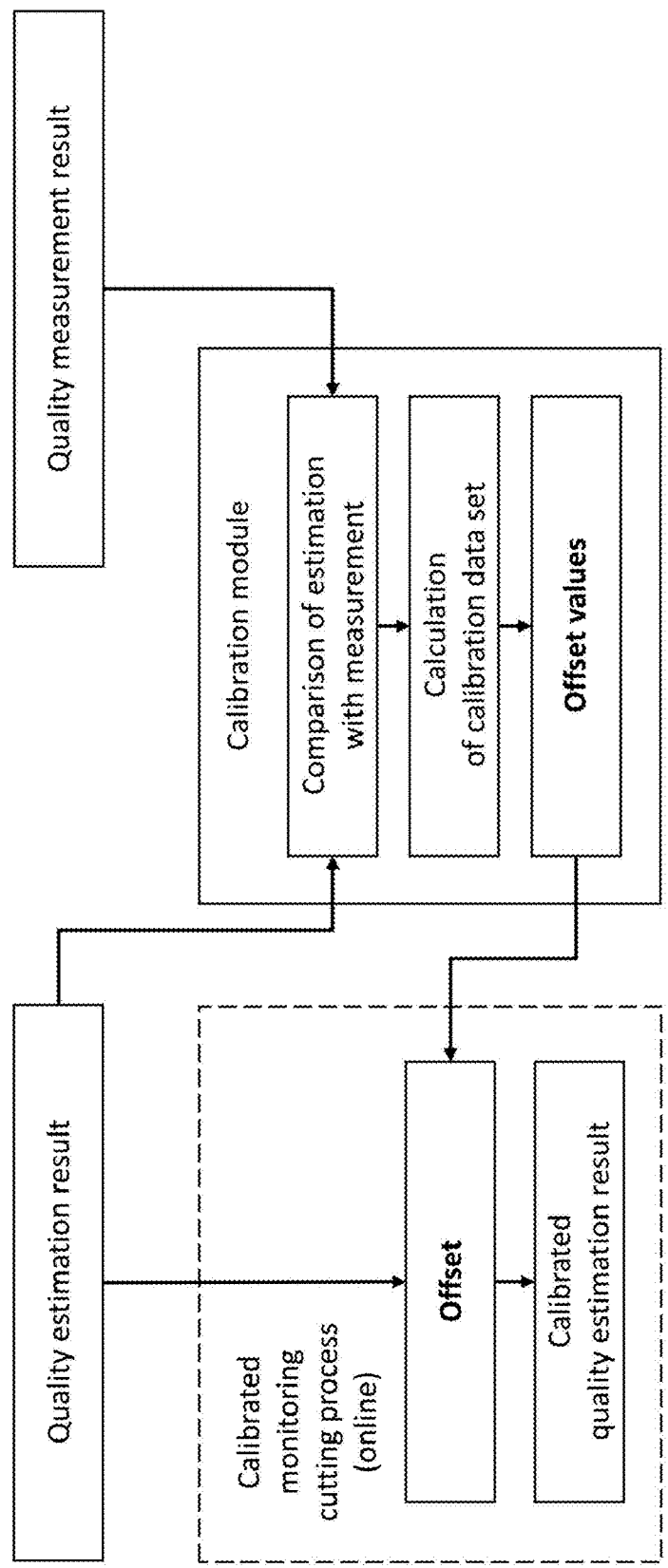
FIG. 7 shows a schematic representation of a simple calibration system.
Figure 8:
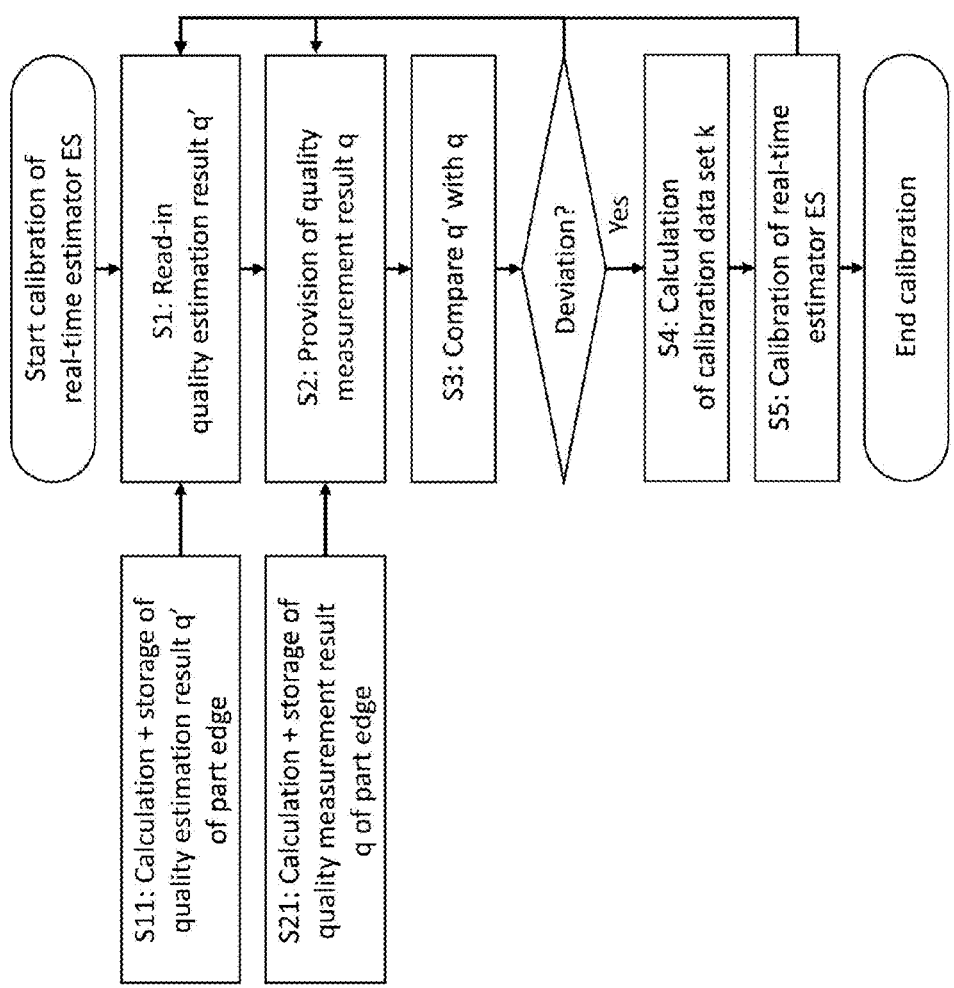
FIG. 8 shows a flowchart according to a preferred embodiment of the invention.

FIG. 8 shows a flow chart according to a preferred embodiment of the invention for calibrating the real-time estimator ES according to a preferred embodiment of the invention. After the start of the method, the quality estimation result q' of the real-time estimator ES is loaded in step S1, which was calculated and stored during cutting from sensor signals of the sensor or detector D of a specific cut, typically from video data of an in-process camera. For this purpose, sensor signals were recorded, from which a quality estimation result is calculated and stored in step S11 using an estimation algorithm. A quality measurement result q is provided in step S2. For this purpose, in response to a trigger signal that can be output by the calibration module, in step S21 a measurement signal, e.g. an image or an image sequence, of the cutting edge of the workpiece is recorded (by means of camera K), which provides the basis for the calculation of the quality measurement result q. Alternatively, the recording by the camera can also be dispensed with if the user enters his input manually on the user interface 22, as described further below in connection with FIG. 9. In step S3, the two instances of the quality data sets can be compared for consistency, namely the quality estimation result q' and the quality measurement result q. If there are deviations or if they exceed a specific tolerance range, the calibration data set k can be calculated and output in step S4 in order to calibrate or readjust the real-time estimator ES in step S5. This can be done by using appropriate setting parameters for the estimation algorithm. The method can be applied intermittently throughout the cutting process, as shown in FIG. 7, with the arrow branching back to step S1 from step S5. However, configurations are preferably possible in advance in order to define the duration and/or the frequency of the calibration procedure. The trigger signal or a trigger can also be parameterised. It is also possible that the estimation for a specific section of the cutting process (e.g. a workpiece) remains constant (so that the estimation result for this section only has to be provided once), but that several measurement signals for e.g. different quality parameters are then to be provided be branched back from step S5 to step S2.

Figure 9:
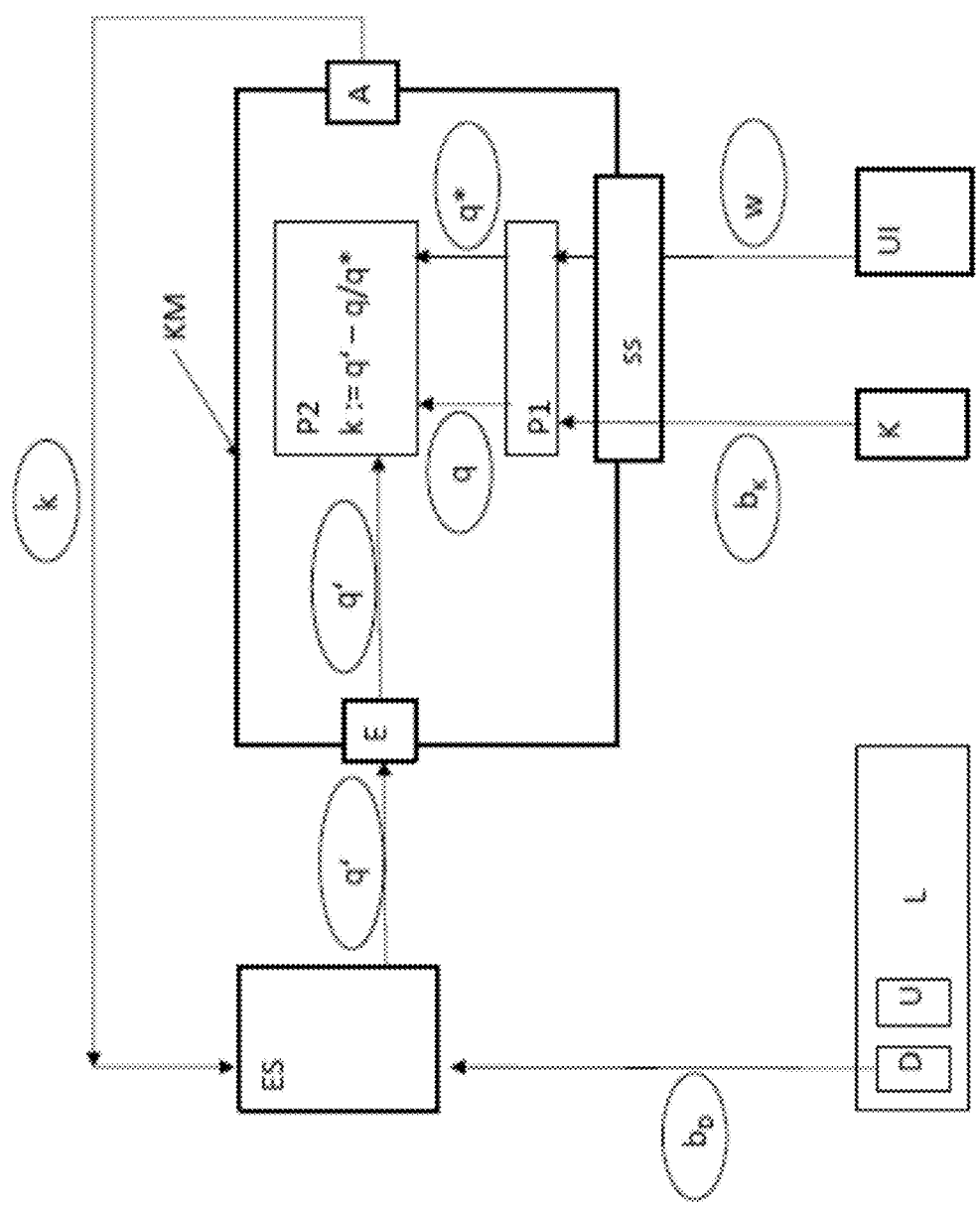
FIG. 9 shows an overview drawing of a system according to a further preferred embodiment of the invention.

FIG. 9 shows a schematic representation according to an embodiment variant of another possible implementation of the calibration module KM for the real-time estimator ES, which is designed for—preferably ongoing, continuous—quality estimation online, i.e. during a cutting process or in real time. Signals bp, preferably optical signals, are continuously supplied to the real-time estimator ES from the sensor D, in particular an in-process camera, which can be attached to the side or coaxially on or in the cutting head, for example, and/or photodiodes. are processed into a quality estimation result q', which—as the name suggests—is intended to estimate the presumed quality of the current cutting process. However, since the condition of the laser changes (wear, ageing, etc.) and the workpiece material is also different and due to other influencing factors, the quality is sometimes incorrectly estimated, which may lead to disadvantageous settings and actually poorer quality can. This can be avoided by the present invention in that the real-time estimator ES is subjected to a calibration or readjustment on the basis of a cutting quality that is actually measured. For this purpose, the measuring device K is provided, which takes pictures $b_K$ of selected cut parts. How many and which parts are to serve as the basis for the recording can be set and configured in a configuration phase-depending on the cutting plan, for example. The measuring device or in particular the camera K can be arranged on the laser cutting machine L, separately from the laser cutting machine or on a follow-up system (sorting robot, as shown in FIG. 2). The camera K can be controlled to take pictures b according to preconfigurable events. This can happen sporadically. The camera K can also be arranged in a mobile device, such as a smartphone or a tablet or the like. The load interface E of the calibration module KM is marked in FIG. 9 for loading the quality estimation result q' of the real-time time estimator ES. A deflection mirror, which can optionally be arranged on the laser head and is used for online process monitoring, is identified by the reference symbol U. For this purpose, after a partial cutting process, which at least partially exposes a cutting edge, a deflection mirror, preferably arranged on the nozzle, can be used in order to detect the exposed cutting edge from the side, looking from above. In this case, the measurement signals are recorded using a measurement device that is configured on the laser cutting machine, in particular on the cutting head. In the latter case, the detector D, which observes the process zone during cutting and detects sensor signals (sensor) can be the same component that later detects the cutting edge of the cut workpiece (measuring device). The sensor is preferably intended for image signal detection. For this purpose, the image signal can be captured either in a productive cut or in a calibration cut.

As shown in FIG. 9, the camera K is basically independent of the sensor D; 2 separate optical detection devices are therefore provided on different components and/or positions of the system. In a variant of the invention, the functionality can also be combined in one device (in particular in the sensor D), so that no separate camera is required.

The camera K is designed to transmit the captured image data to a first processor P1 of the calibration module KM via a wired or wireless connection—designated interface ss in FIG. 9. The first processor P1 is intended to provide a quality measurement result q of the cutting edge of the finished cut workpiece, the quality measurement result q mainly based on the detection of measurement signals of the cutting edge of the respective finished cut workpiece by means of the camera K and optionally subsequent image analysis by suitable image processing algorithms by means of artificial neural networks (ANNs) is calculated. The term 'quality measurement result' is used because the quality is 'measured' directly or indirectly (indirectly through the camera images $b_K$) and the calculation is based on actually recorded or measured values. For the use of ANNs, please refer to the following publications: (1) Tatzel L., León F.: Image-based roughness estimation of laser cutting edges with a convolutional neural network, Lane 2020; (2) Giusti A. et al.: Image-based Measurement of Material Roughness using Machine Learning Techniques, ISEM 2020; (3) De Mitri O. et al.: Image acquisition, evaluation and segmentation of thermal cutting edges using a mobile device, SPIE Photonics 2019; (4) Soukup D, Huber-Mork R (2014) Convolutional Neural Networks for Steel Surface Defect Detection from Photometric Stereo Images. In: Bebis G. et al. (eds) Advances in Visual Computing. ISVC 2014. Lecture Notes in Computer Science, vol 8887. Springer, Cham.

In a further development of the invention, the calculation of the quality measurement result can take other measurement data into account in addition or as an alternative to the captured camera image data, such as data from other measuring devices and/or metadata that is also captured with the measurement data captured by sensors and/or machine data that characterise the cutting process of the laser, such as the type of laser, laser power, speed, etc. The first processor P1 is intended to calculate a quality measurement result q from the data provided and in particular from the image data of the cutting edge BK.

A second processor P2 of the calibration module KM is then intended to compare the loaded quality estimation result q', which was provided by the real-time estimator ES, with the actual or real quality measurement result q, which was provided by the first processor P1. This is in FIG. 9 with the formula:

$$\text{``}k:=q'-q/q*\text{''}$$

marked to make it clear that the calibration data set k results from the deviation between estimate q' and measurement q or manual input q*. According to a preconfigurable event pattern, the second processor P2 is then intended to calculate a calibration data set k for calibrating the real-time estimator ES and to forward the result with the calibration data set k to an output interface A, which is intended to output the calculated calibration data set k.

In a first embodiment, the quality measurement result q is calculated algorithmically and automatically on the first processor P1, based on the captured images $b_K$ from the camera K.

In a second embodiment, a fully or partially manual approach may be performed by a user manually inspecting and evaluating the cutting edge of the cut workpiece. For this purpose, suitable input fields can be made available to him/her on a user interface UI, into which he can enter certain values w for selected and/or preconfigured quality parameters, such as roughness, burr formation and others. The entered values w are then supplied to the first processor P1, which then executes a simple routine and determines the quality measurement result q* from the entered values. A method can be selected for this routine, as described in WO2020069889 A1. A partially manual input can therefore also be used, in which primarily qualitative values such as "good", "medium", etc. can be entered. If the online quality estimations can also be assigned to such qualitative values (as suggested above), then the values from online and offline quality can be easily compared with one another or adjusted.

In a further embodiment, a combination of the two alternatives mentioned above can also be used. This has the advantage that the automatically calculated quality measurement result q can be subjected to verification. For this purpose, the automatically calculated quality measurement result q is compared with the determined quality measurement result q*, which was based on the user's manual inputs. In the event of deviations (e.g. above a threshold), a checking routine is triggered again and the user can be prompted to make another entry, for example. If the deviation persists, this indicates an error in the calculation of the quality measurement result and an error message can be output in order, for example, to initiate an improvement in the calculation function that is executed on the first processor P1 to calculate the quality measurement result q.

Figure 10:
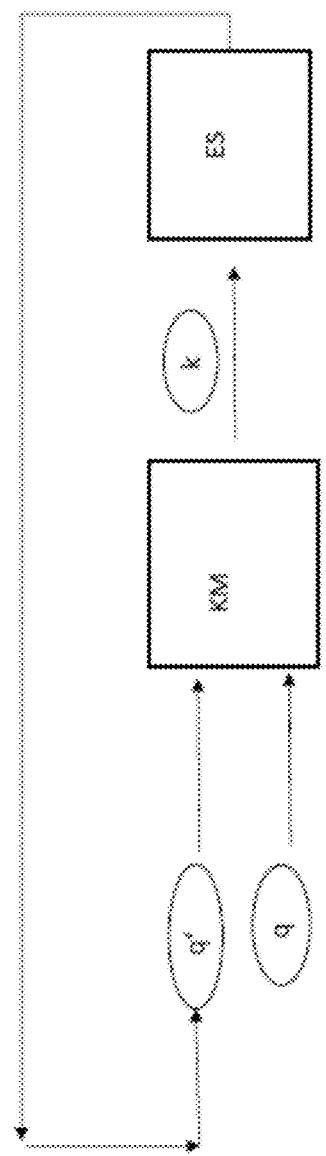
FIG. 10 shows a schematic representation of the interaction of the calibration model with the real-time estimator.

FIG. 10 shows a schematic representation of the calibration module KM in data exchange with the real-time estimator ES. Both the quality measurement result q and the quality estimation result q' are supplied to the calibration module KM in a highly abstract manner. The calibration data set k can then be calculated on the basis of these data sets, which of course relate to the same cutting edge. The calibration data set k is then forwarded to the real-time estimator ES for calibration.

Different methods can be used to derive the cutting quality from photographed cutting edges. For example, comparison images of high-quality cuts could be stored and compared with current images in order to assess the current cutting quality. For further reference, refer to the publication 'Soukup D., Huber-Mörk R. (2014) Convolutional Neural Networks for Steel Surface Defect Detection from Photometric Stereo Images. In: Bebis G. et al. (eds) Advances in Visual Computing. ISVC 2014. Lecture Notes in Computer Science, vol 8887. Springer, Cham', which deals with the possibility of characterising metal surfaces using CNN and images from different perspectives., which can be found here: https://pdfs.semanticscholar.org/b2b8/ab163fb0183325dd3458e3cbaad2f8bf265e.pdf.

For more on estimating the roughness of laser cuts using deep learning, please refer to the following publication: Tatzel L., León F.: Image-based roughness estimation of laser cutting edges with a convolutional neural network, Lane 2020.

The offline quality measurement of selected cutting edges on selected parts for the purpose of calibrating the online quality estimation is particularly useful for laser machines that have a machine handling system or have one connected to it. The cut parts are removed from the cutting table/cleared/stacked and/or restacked by robots (or similar). Systems that already have a camera connection during clearing or sorting are particularly suitable. It is easy for the sorting or clearing robot to present the cutting edge of a selected part to the camera. A separate camera might also be beneficial. If an image of the cutting edge is available, the real cutting quality can be determined (roughness, burr, . . . ) and supplied back to the machine. The cutting quality includes the following features (not exhaustive), whereby some features are also referred to as quality defects: Roughness, craters, burrs, slag residue, welding. The machine can compare (i.e. calibrate) the measured quality (e.g. sporadically via the 2nd camera) of the cutting edge with the quality estimated online via the 1st sensor (e.g. process signals, such as process lights) and, if necessary, in particular but not necessarily, recalibrate or adjust the estimated quality if there is a deviation above a certain threshold.

The solution presented enables a fully automatic cutting system, which allows the required/desired cutting quality to be maintained due to the periodic checking (calibration).

Even without the above-mentioned handling systems (robots), the idea can be integrated into any automation system—at least online a 1st sensor in/on the cutting head for monitoring the process signals and at least a 2nd sensor or camera in a position that enables the quality of a cutting edge to be determined.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise the advantageous effects thereof, even if the combination is not explicitly mentioned.

The scope of protection of the present invention is given by the claims and is not limited by the features illustrated in the description or shown in the figures.

It is particularly obvious to a person skilled in the art that the invention can be used not only for sheet metal cutting systems, but also for other systems involving lasers which require a high degree of quality. Furthermore, the components of the calibration module or of the system can be distributed over several physical products (distributed system) with suitable data connections.

The invention claimed is:

1. A method for calibrating a real-time estimator model of a real-time estimator with a calibration data set generated by a calibration module that includes a calibration model, the method comprising steps of:
   cutting a workpiece by a laser cutting machine performing a cutting method;
   loading a quality estimation result generated by the real-time estimator model of cutting performed by the laser cutting machine, wherein the quality estimation result is determined on a basis of sensor signals input to the real-time estimator model, wherein the sensor signals are received from at least one sensor, wherein the at least one sensor is configured as an optical sensor;
   detecting measurement signals of a cutting edge of a cut workpiece by a measuring device after cutting, wherein the measuring device is an optical measuring device;
   providing a quality measurement result of the cutting edge of the workpiece, wherein the quality measurement result of the cutting edge is based on the detected measurement signals;
   comparing the quality estimation result with the quality measurement result to generate a comparison result, wherein a position identifier is assigned and/or stored for the detected sensor signals and for the detected measurement signals, wherein the detected sensor signals are assigned to the detected measurement signals based on their position identifiers, and based on the comparison result, only if deviations that are determined exceed a preconfigurable threshold value, executing steps of:
   calculating a calibration data set, by the calibration model, for calibrating the real-time estimator model, and
   calibrating or readjusting the real-time estimator model using the calibration data set.

2. The method according to claim 1, wherein the real-time estimator model is configured to execute an estimation algorithm, and wherein the estimation algorithm calculates the quality estimation result at least from the detected sensor signals received from the at least one sensor.

3. The method according to claim 2, wherein the estimation algorithm of the real-time estimator model comprises a deep convolutional neural network.

4. The method according to claim 1, wherein the detection of the sensor signals and/or the measurement signals are configured based upon an execution time and/or an execution type.

5. The method according to claim 1, wherein metadata are assigned and/or stored with the detected sensor signals and/or the detected measurement signals.

6. The method according to claim 1, wherein the calibration data set includes an offset which is applied to the quality estimation result generated by the real-time estimator model.

7. The method according to claim 1, wherein the calibration data set is calculated specifically for a material and/or a cutting process.

8. The method according to claim 1, wherein the calibration data set contains parameters of the calibration model that has been trained with the quality estimation results and the quality measurement results assigned to one another.

9. The method according to claim 8, wherein the calibration model is selected or combined from: a regression model, a support vector machine, a random forest, a gradient boosted tree, an artificial neural network and/or in which an ensemble learning approach with a combination of different models is used.

10. The method according to claim 8, wherein the calibration model is trained by using additional stored intermediate results of the real-time estimator model as training data, wherein the intermediate results of the real-time estimator model comprises activation values of neurons of a convolutional neural network, arranged in front of an output layer.

11. The method according to claim 10, wherein the calibration model is trained using stored input data of the real-time estimator model and assigned the quality measurement results as training data.

12. The method according to claim 8, wherein the calibration model and/or the real-time estimator model is adapted using an action-reward learning algorithm.

13. The method according to claim 8, wherein the calibration model and/or the real-time estimator model is adapted to new materials by means of a transfer learning method.

14. The method according to claim 1, wherein the detection of the sensor signals of the cutting edge is carried out on a calibration cut or without the calibration cut.

15. The method according to claim 1, wherein the detection of the measurement signals by the measuring device takes place via a deflection mirror.

16. The method according to claim 1, wherein the quality measurement result is provided by an input data set via a user interface.

17. The method according to claim 1, wherein execution of the real-time estimator model and the steps of loading, providing, and comparing are carried out after a calibration cut has been performed.

18. The calibration module, comprising a first processor and a second processor, for calibrating the real-time estimator model, wherein the calibration module is configured to execute the method according to claim 1, the calibration module further comprising:

a load interface, which includes a processor, for loading the quality estimation result generated by the real-time estimator model;

the measuring device, which is configured for detecting the measurement signals of the cutting edge of the cut workpiece;

wherein the first processor is configured to provide the quality measurement result of the cutting edge of the workpiece using the detected measurement signals received from the measuring device, wherein the quality measurement result is provided by means of the measuring device;

wherein the second processor is configured to compare the quality estimation result with the quality measurement result, wherein the position identifier is assigned and/or stored for the detected sensor signals and for the detected measurement signals, via which the detected signals are clearly identifiable and are assigned to one another for the comparison step, and based on the result, only if deviations that are determined exceed the preconfigurable threshold value:

the second processor is configured to calculate a calibration data set for calibrating the real-time estimator; and an output interface, wherein the calculated calibration data set is output via the output interface and used to calibrate or readjust the real-time estimator model.

19. A system with the real-time estimator model and the calibration module according to claim 18 to be used for a laser cutting machine.

20. The system according to claim 19, wherein the system comprises or is in data communication with the at least one sensor.

* * * * *